(12) United States Patent
Lee et al.

(10) Patent No.: US 11,183,737 B2
(45) Date of Patent: Nov. 23, 2021

(54) ELECTRODE ASSEMBLY, METHOD OF MANUFACTURING THE SAME AND SECONDARY BATTERY INCLUDING THE SAME

(71) Applicant: LG Chem, Ltd., Seoul (KR)

(72) Inventors: Jung Pil Lee, Daejeon (KR); Sung Ju Cho, Daejeon (KR)

(73) Assignee: LG Chem, Ltd.

( * ) Notice: Subject to any disclaimer, the term of this patent is extended or adjusted under 35 U.S.C. 154(b) by 180 days.

(21) Appl. No.: 16/463,197

(22) PCT Filed: Aug. 11, 2017

(86) PCT No.: PCT/KR2017/008798
§ 371 (c)(1),
(2) Date: May 22, 2019

(87) PCT Pub. No.: WO2019/031638
PCT Pub. Date: Feb. 14, 2019

(65) Prior Publication Data
US 2020/0067049 A1 Feb. 27, 2020

(51) Int. Cl.
*H01M 50/46* (2021.01)
*H01M 10/647* (2014.01)
*H01M 4/62* (2006.01)

(52) U.S. Cl.
CPC ......... *H01M 50/461* (2021.01); *H01M 4/622* (2013.01); *H01M 10/647* (2015.04)

(58) Field of Classification Search
CPC .......................... H01M 50/461; H01M 4/622
See application file for complete search history.

(56) References Cited

U.S. PATENT DOCUMENTS

| 6,387,565 B1 | 5/2002 | Aihara et al. |
| 2013/0229194 A1 | 9/2013 | Palazzotto et al. |
| 2014/0272532 A1 | 9/2014 | Park et al. |
| 2015/0259579 A1 | 9/2015 | Harada et al. |

(Continued)

FOREIGN PATENT DOCUMENTS

| CN | 1251214 A | 4/2000 |
| CN | 103154712 A | 6/2013 |
| CN | 104051689 A | 9/2014 |

(Continued)

OTHER PUBLICATIONS

Takashima Yoshinori et al.: "Functioning via host-guest interactions", Journal of Inclusion Phenomena and Macrocyclic Chemistry, Kluwer, Dordrecht, NL, vol. 87, No. 3, Mar. 9, 2017, pp. 313-330.

(Continued)

*Primary Examiner* — Ula C Ruddock
*Assistant Examiner* — Thomas H. Parsons
(74) *Attorney, Agent, or Firm* — Lerner, David, Littenberg, Krumholz & Mentlik, LLP (57) ABSTRACT

The present invention provides an electrode assembly, which includes a first electrode, an adhesive layer disposed on the first electrode and including a host layer comprising a host and a guest layer comprising a guest, a separator disposed on the adhesive layer, and a second electrode disposed on the separator, a method of manufacturing the same, and a secondary battery including the same.

18 Claims, 3 Drawing Sheets

(56) References Cited

U.S. PATENT DOCUMENTS

2016/0036087 A1\* 2/2016 Na ................. H01M 10/0413
                                                    156/306.6
2016/0104919 A1    4/2016 Arishima

FOREIGN PATENT DOCUMENTS

| | | | |
|---|---|---|---|
| EP | 0971430 | A1 | 1/2000 |
| JP | H06168739 | A | 6/1994 |
| JP | 2002313307 | A  \* | 10/2000 |
| JP | 2002313307 | \* | 10/2002 |
| JP | 2007095480 | A | 4/2007 |
| JP | 5245201 | B2 | 7/2013 |
| JP | 2015191866 | A | 11/2015 |
| KR | 20000076154 | A | 12/2000 |
| KR | 20070104689 | A | 10/2007 |
| KR | 20080066309 | A | 7/2008 |
| KR | 101031179 | \* | 4/2011 |
| KR | 101031179 | B1 | 4/2011 |
| KR | 20140026009 | A | 3/2014 |
| KR | 101499353 | B1 | 3/2015 |
| KR | 20160033013 | A | 3/2016 |
| KR | 20170074651 | A | 6/2017 |
| WO | 2012036069 | A1 | 3/2012 |

OTHER PUBLICATIONS

Extended European Search Report for Application No. EP 17921137.0 dated Nov. 5, 2019, 8 pages.
International Search Report for Application No. PCT/KR2017/008798 dated May 9, 2018.
Chinese Search Report for Application No. 201780071487.4 dated Aug. 30, 2021, pp. 1-3.

\* cited by examiner

ELECTRODE ASSEMBLY, METHOD OF MANUFACTURING THE SAME AND SECONDARY BATTERY INCLUDING THE SAME

CROSS-REFERENCE TO RELATED APPLICATIONS

This application is a national phase entry under 35 U.S.C. § 371 of International Application No. PCT/KR2017/008798 filed Aug. 11, 2017, the disclosure of which is incorporated herein by reference.

TECHNICAL FIELD

The present invention relates to an electrode assembly, a method of manufacturing the same, and a secondary battery including the same.

BACKGROUND ART

Recently, due to the expanded application of energy storage technology in mobile phones, camcorders, notebook computers, and electric vehicles, research and development efforts for batteries are increasing. Electrochemical devices are the most notable area in such efforts, and among these devices, lithium secondary batteries have been commercialized and widely used due to high energy density, high voltage, long cycle life, and low magnetic discharge rate.

The lithium secondary batteries are classified according to the structure of an electrode assembly consisting of a positive electrode, a separator and a negative electrode. Examples of the electrode assembly may include a jelly-roll (folding)-type electrode assembly in which long sheet-type positive electrode and negative electrode are folded while a separator is interposed therebetween, a stacked electrode assembly in which various positive electrodes and negative electrodes cut in a predetermined size are sequentially stacked while a separator is interposed therebetween, and a stacked/folding-type electrode assembly in which bi-cells or full-cells are formed by stacking a positive electrode and a negative electrode of a predetermined unit and a separator interposed therebetween is aligned on a long sheet-type separation sheet and then folded.

In these electrode assemblies, when electrodes and a separator are stacked (lamination process), the electrodes may not be fixed at a proper position. Because of compositional differences between a positive electrode and a negative electrode included in an electrode assembly, there may be differences in adhesive strength between a positive electrode and a separator and between a negative electrode and a separator, thereby contributing to problems with electrolyte wettability. In addition, when such electrode assemblies are subjected to impact, electrodes and subsequently the separator may become detached, thereby causing a short-circuit, and possibly damaging the separator. Therefore, the lifespan and stability of the battery may be reduced. For this reason, a technique of allowing the separator to have similar adhesive strengths to the positive electrode and the negative electrode is necessary.

DISCLOSURE

Technical Problem

The present invention is directed to providing an electrode assembly with excellent adhesive strength, in which electrodes and a separator are fixed to proper positions.

The present invention is also directed to providing an electrode assembly in which an adhesive strength between a negative electrode and a separator is equivalent to an adhesive strength between a positive electrode and a separator and thus has excellent electrolyte wettability.

The present invention is also directed to providing a secondary battery having low risks of short-circuit and a separator damage upon external impact.

Technical Solution

To achieve the above-described objects, the present invention provides an electrode assembly, which includes a first electrode; an adhesive layer disposed on the first electrode and including a host layer comprising a host and a guest layer comprising a guest; a separator disposed on the adhesive layer; and a second electrode disposed on the separator.

The present invention also provides a method of manufacturing an electrode assembly, which includes: forming a host layer comprising a host on a first electrode (Step 1-1); forming a guest layer including a guest on one surface of a separator (Step 1-2); forming an adhesive layer by disposing the host layer and the guest layer to be in contact with each other (Step 1-3); and disposing a second electrode on the other surface of the separator (Step 1-4).

The present invention also provides a method of manufacturing an electrode assembly, which includes: forming a guest layer comprising a guest on a first electrode (Step 2-1); forming a host layer comprising a host on one surface of a separator (Step 2-2); forming an adhesive layer by disposing the guest layer and the host layer to be in contact with each other (Step 2-3); and disposing a second electrode on the other surface of the separator (Step 2-4).

The present invention also provides a secondary battery including the electrode assembly.

Advantageous Effects

In an electrode assembly of the present invention, an electrode and a separator can be controlled to be fixed at proper positions using the principle of host-guest chemistry, and an adhesive strength between the electrode and the separator can also be improved. Electrolyte wettability of the electrode assembly of the present invention can be improved. In addition, in the secondary battery including the electrode assembly of the present invention, detachment of electrodes upon external impact is less likely to occur, and therefore there is a low risk of short-circuit caused by damage to the separator.

MODES OF THE INVENTION

The terms and words used herein and in the claims should not be interpreted as being limited to conventional or literal meanings, but should be interpreted with meanings and concepts which are consistent with the technological scope of the invention based on the principle that the inventors have appropriately defined concepts of terms in order to describe the invention in the best way.

While the present invention has been explained with reference to exemplary embodiments shown in the drawings, which are merely exemplary, it will be understood by those of ordinary skill in the art that various modifications and equivalent other embodiments can be implemented from the given embodiments. Accordingly, the genuine technical range of the present invention to be protected should be determined by the technical idea of the accompanying claims.

Figure 1:
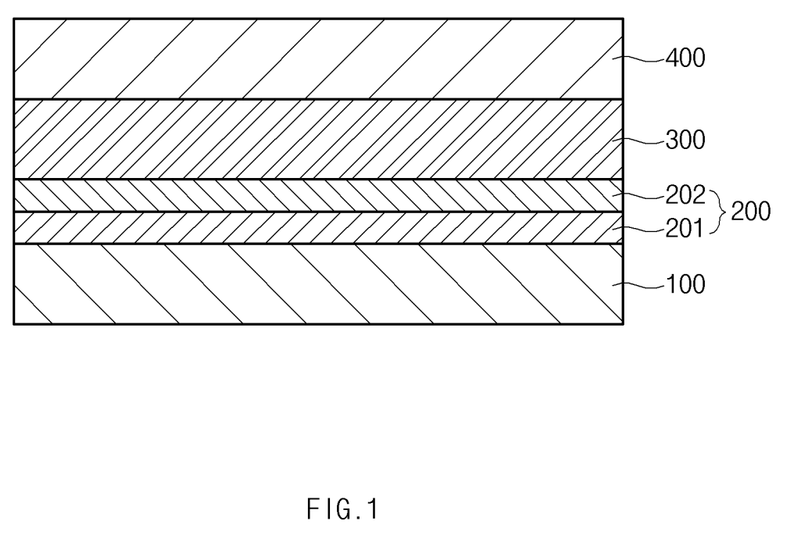
FIG. 1 is a cross-sectional view of an electrode assembly according to an exemplary embodiment of the present invention.

FIG. 1 is a cross-sectional view of an electrode assembly according to an exemplary embodiment of the present invention.

Referring to FIG. 1, the electrode assembly according to an exemplary embodiment of the present invention includes a first electrode 100, an adhesive layer 200, a separator 300 and a second electrode 400.

The first electrode 100 or the second electrode 400 may be a positive electrode or a negative electrode, but in the electrode assembly according to an exemplary embodiment of the present invention, may be a negative electrode.

The first electrode 100 may include a first electrode collector and a first electrode active material layer disposed on one surface of the first electrode collector. The second electrode 400 may include a second electrode collector and a second electrode active material layer disposed on one surface of the second electrode collector. The first electrode collector or the second electrode collector may be a positive electrode collector or a negative electrode collector. The first electrode active material layer or the second electrode active material layer may be a positive electrode active material layer or a negative electrode active material layer.

The positive electrode collector does not cause a chemical change to a lithium secondary battery according to an exemplary embodiment of the present invention and has high conductivity. The positive electrode collector may have a finely uneven surface, thereby increasing an adhesive strength of the positive electrode active material, and may be in various forms such as a film, a sheet, a foil, a net, a porous body, a foaming body, and a non-woven fabric body. Specific examples of the positive electrode collector may include stainless steel, aluminum, nickel, titanium, calcined carbon, and aluminum. The stainless steel may be surface-treated with carbon, nickel, titanium, or silver.

The positive electrode active material layer may be formed of a mixture of a positive electrode active material, a conducting material, and a binder, and a filler may be further included in the mixture.

Specific examples of the positive electrode active materials may include a layered compound such as a lithium transition metal oxide (Li(Ni$_a$Mn$_b$Co$_c$)O$_2$), lithium cobalt oxide (LiCoO$_2$), or lithium nickel oxide (LiNiO$_2$); a compound substituted with one or two or more transition metals; a lithium manganese oxide such as Li$_{1+x}$Mn$_{2-x}$O$_4$ (x=0~0.33), LiMnO$_3$, LiMn$_2$O$_3$, or LiMnO$_2$; lithium copper oxide (Li$_2$CuO$_2$); vanadium oxide such as LiV$_3$O$_8$, LiFe$_3$O$_4$, V$_2$O$_5$, or Cu$_2$V$_2$O$_7$; a lithium manganese composite oxide represented by Formula LiNi$_{1-x}$M$_x$O$_2$ (M=Co, Mn, Al, Cu, Fe, Mg, B, or Ga, and x=0.01~0.3); a lithium manganese oxide of a spinel structure represented by LiNi$_x$Mn$_{2-x}$O$_4$; LiMn$_2$O$_4$ in which a part of the Li of the above Formula is substituted with alkali earth metal ions; a disulfide compound; Fe$_2$(MoO$_4$)$_3$; or nickel-cobalt-manganese oxide.

The conducting material does not cause a chemical change to a lithium secondary battery according to an exemplary embodiment of the present invention and has conductivity. A specific example of the conducting material may be a graphite such as natural graphite or artificial graphite; a carbon black such as acetylene black, ketjen black, channel black, furnace black, lamp black, or thermal black; a conductive fiber such as carbon fiber or a metal fiber; a metal powder such as fluorofiber, aluminum, or a nickel powder; a conductive whisky such as zinc oxide or potassium titanate; a conductive metal oxide such as titanium oxide; or a conductive material such as a polyphenylene derivative.

The binder is a component which helps bonding a positive electrode active material and a conducting material and binding to a collector. Specific examples of the binder may include polyvinylidenefluoride, polyvinylalcohol, carboxymethylcellulose (CMC), starch, hydroxypropylcellulose, regenerated cellulose, polyvinylpyrrolidone, tetrafluoroethylene, polyethylene, polypropylene, ethylene-propylene-diene monomer (EPDM) rubber, hydrogenated nitrile butadiene rubber (HNBR), sulfonated EPDM, styrene butadiene rubber, fluorine rubber, and various copolymers.

The filler is a component that suppresses expansion of a positive electrode, which is a fiber-shape material that does not cause a chemical change to the lithium secondary battery according to an exemplary embodiment of the present invention. The filler may be an olefin-based polymer such as polyethylene or polypropylene; or a fibrous material such as a glass fiber or a carbon fiber.

The negative electrode collector does not cause a chemical change to a lithium secondary battery according to an exemplary embodiment of the present invention and has conductivity. A specific example of the negative electrode collector may be copper, stainless steel, aluminum, an aluminum-cadmium alloy, nickel, titanium, or calcined carbon. The copper or stainless steel may be surface-treated with carbon, nickel, titanium or silver. Like the positive electrode collector, the negative electrode collector may have a finely uneven surface to reinforce a binding strength of the negative electrode active material, and may be in various forms such as a film, a sheet, a foil, a net, a porous body, a foaming body, and a non-woven fabric body.

The negative electrode active material layer may include a negative electrode active material, and further include a conducting material, a binder, and a filler.

Specific examples of the negative electrode active material may include a carbon such as a non-graphitizing carbon or a graphite-based carbon; a metal composite oxide such as Li$_x$Fe$_2$O$_3$(0≤x≤1), Li$_x$WO$_2$(0≤x≤1), Sn$_x$Me$_{1-x}$Me'$_y$O$_z$ (Me=Mn, Fe, Pb, Ge; Me'=Al, B, P, Si, elements in Group I, II, and III on the periodic table, halogen; 0≤x≤1; 1≤y≤3; 1≤z≤8); a lithium metal; a lithium alloy; a silicon-based alloy; a tin-based alloy; a metal oxide such as SnO, SnO$_2$, PbO, PbO$_2$, Pb$_2$O$_3$, Pb$_3$O$_4$, GeO, GeO$_2$, Bi$_2$O$_3$, or Bi$_2$O$_5$; a conductive polymer such as polyacetylene; a Li—Co—Ni-based material; titanium oxide; and lithium titanium oxide.

Descriptions of the conducting material, binder and filler are the same as those used in the positive electrode and will be omitted.

The adhesive layer 200 is disposed on the first electrode 100, and includes a host layer 201 comprising a host and a guest layer 202 comprising a guest. Specifically, the adhesive layer 200 may be disposed on the other surface of the first active material layer on which the first electrode collector is not disposed.

In FIG. 1, the host layer 201 is disposed on the first electrode 100, and the guest layer 202 is disposed on the host layer 201. Alternatively, the guest layer may be disposed on the first electrode 100, and the host layer may be disposed on the guest layer.

The host and the guest may be materials binding to each other by molecular recognition or self-assembly, thereby forming a complex. The host may be a supramolecule, which may be a circular molecule which has a cavity therein and in which a different molecule can be bound thereinto. The guest may be a molecule or ion that can be bound to the supramolecule by molecular recognition or self-assembly.

Due to the characteristics of the host and the guest, when the host layer 201 and the guest layer 202 are disposed to be in contact with each other, and more specifically when the host layer 201 is disposed on the first electrode 100, the guest layer 202 is disposed on the separator 300, and then the host layer 201 and the guest layer 202 are disposed to be in contact with each other, the host and the guest are bound to each other by molecular recognition or self-assembly, thereby forming an adhesive layer 200.

When distribution of the host or guest on the first electrode 100 or the separator 300 is controlled, the first electrode 100 and the separator 300 may be controlled to more precisely fixed in desired positions, that is, in correct positions, by molecular recognition or self-assembly.

In addition, when an amount of the host or guest, that is, a loading amount is controlled on the first electrode 100 or the separator 300, an adhesive strength thereof may be controlled and improved. More specifically, due to the compositional difference between the negative electrode and the positive electrode, there may be differences in adhesive strength between the negative electrode and the separator and between the positive electrode and the separator. Here, when the amount of the host or guest between the negative electrode and the separator and/or between the positive electrode and the separator is controlled, the adhesive strength between the negative electrode and the separator and the adhesive strength between the positive electrode and the separator may be controlled to be equivalent. When the adhesive strength between the negative electrode and the separator and the adhesive strength between the positive electrode and the separator are the same as each other, wettability with respect to an electrolyte of the electrode assembly may be improved. When the adhesive strength between the first electrode 100 and the separator 300 is improved, there may be a reduction in the chance of a short-circuit or damage to the separation film caused by the detachment of the first electrode 100 from the separator 300 upon external impact.

Specific examples of the host may include cyclodextrin, calixarene, pillararene, cucurbituril, porphyrin, metallacrown, crown ether, zeolite, cyclotriveratrylene, cryptophane, carcerand, and foldamer. Specifically, the cyclodextrin may be α-cyclodextrin, β-cyclodextrin, or γ-cyclodextrin. One or more types of the host may be included in the host layer 201.

The guest may be any material capable of making molecular recognition or self-assembly with the host, and may be, but is not particularly limited to, ferrocene, cadmium, lead, a lanthanide element, an actinide element, tetraphenylethene, p-xylenediammonium, Fe, Mg, Mn, N,N-bis(salicylaldehyde)ethylenediamine, or rotaxane. One or more types of the guest may be included in the guest layer 202.

The guest capable of making molecular recognition or self-assembly possible with the host will be described in detail. When the host is cyclodextrin, the guest may be ferrocene or rotaxane, and when the host is calixarene, the guest may be cadmium, lead, a lanthanide element, or an actinide element. When the host is pillararene, the guest may be tetraphenylethene. When the host is cucurbituril, the guest may be p-xylenediammonium or rotaxane. When the host is porphyrin, the guest may be Fe, Mg or Mn. When the host is zeolite, the guest may be N,N-bis(salicylaldehyde) ethylenediamine.

The separator 300 prevents a short-circuit between the negative electrode and the positive electrode and provides a migration path of lithium ions. The separator 300 may be an insulating thin film having high ion permeability and mechanical strength. Specific examples of the separator 300 may include a polyolefin-based polymer film such as polypropylene or polyethylene or a multi film thereof, a microporous film, a woven fabric, and a non-woven fabric. When a solid electrolyte such as a polymer is used as an electrolyte, the solid electrolyte may also be used as the separator.

The electrolyte may be a non-aqueous electrolyte containing a lithium salt. Specific examples of the lithium salt may include LiCl, LiBr, LiI, $LiClO_4$, $LiBF_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $(CF_3SO_2)_2NLi$, lower aliphatic lithium carbonate, lithium tetraphenyl borate, imide, and the like.

The non-aqueous electrolyte may be any one used in the battery, and may be, but is not particularly limited to, a non-aqueous organic solvent, an organic solid electrolyte, or an inorganic solid electrolyte. Specifically, the organic solid electrolyte may be a polyethylene derivative, a polyethylene oxide derivative, a polypropylene oxide derivative, a phosphoric acid ester polymer, poly agitation lysine, polyester sulfide, a polyvinylalcohol, a polyvinylidenefluoride, or a polymer comprising an ionic dissociable group.

The second electrode 400 may be disposed on the separator 300, and may be a positive electrode or a negative electrode. The positive electrode and negative electrode have been described, and thus a description thereof will be omitted.

A separate adhesive layer may be further included between the separator 300 and the second electrode 400. The separate adhesive layer may have the same configuration as the adhesive layer 200, and may be a conducting material slurry including a conducting material and a binder, such as a general adhesive layer.

When the separate adhesive layer has the same configuration as the adhesive layer 200, the host layer is disposed on the separator 300, the guest layer may be disposed on the host layer, and the second electrode 400 may be disposed on the guest layer. In addition, the guest layer may be disposed on the separator 300, a host layer may be disposed on the guest layer, and the second electrode 400 may be disposed on the host layer. Description of the separate adhesive layer is the same as that of the adhesive layer 200.

The conducting material and the binder may be the same as in the description of the negative electrode.

Hereinafter, several methods of manufacturing an electrode assembly according to an exemplary embodiment of the present invention will be described.

One of the methods of manufacturing an electrode assembly according to an exemplary embodiment of the present invention includes forming a host layer 201 comprising a host on a first electrode 100 (Step 1-1).

Step 1-1 may be a step for forming a host layer 201 by coating the first electrode 100 with a composition for forming a host layer including a host and a solvent such that an amount of the host loaded becomes 0.5 mg/25 cm² to 20 mg/25 cm$^2$, preferably 1.5 mg/25 cm$^2$ to 5 mg/25 cm$^2$, and more preferably 2 mg/25 cm$^2$ to 2.5 mg/25 cm$^2$.

When the above-described conditions are satisfied, the adhesive strength between the electrode and the separator is increased, and a volume resistance and a wetting speed of the electrode are decreased to a level that does not affect battery performance.

The detailed description of the host has been provided and will be omitted. Specifically, the solvent may be a non-aqueous solvent such as acetone, potassium hydroxide, tetrahydrofuran (THF), isopropylalcohol (IPA), chloroform, toluene, or an aqueous solvent such as water.

A specific method of forming the host layer 201 may be doctor blading, screen printing, spray coating, flow coating, spin coating, dip coating or bar coating.

One of the methods of manufacturing an electrode assembly according to an exemplary embodiment of the present invention includes forming a guest layer 202 comprising a guest on one surface of a separator 300 (Step 1-2).

Step 1-2 may be a step for forming a guest layer 202 by coating one surface of the separator 300 with a composition for forming a guest layer including a guest and a solvent such that an amount of the guest loaded becomes 0.5 mg/25 cm$^2$ to 20 mg/25 cm$^2$, preferably 1.5 mg/25 cm$^2$ to 5 mg/25 cm$^2$, and more preferably 2 mg/25 cm$^2$ to 2.5 mg/25 cm$^2$.

When the above-described condition is satisfied, an adhesive strength between the electrode and the separator is increased, and a volume resistance and a wetting speed of the electrode are decreased to a level that does not affect battery performance.

The detailed description of the guest has been provided and will be omitted. Specifically, the solvent may be a non-aqueous solvent such as acetone, tetrahydrofuran (THF), isopropylalcohol (IPA), chloroform, toluene, or an aqueous solvent such as water.

A specific method of forming the guest layer 202 may be doctor blading, screen printing, spray coating, flow coating, spin coating, dip coating, or bar coating.

One of several methods of manufacturing an electrode assembly according to an exemplary embodiment of the present invention includes forming an adhesive layer 200 by disposing the host layer 201 and the guest layer 202 to be in contact with each other (Step 1-3).

One of several methods of manufacturing an electrode assembly according to an exemplary embodiment of the present invention includes disposing a second electrode 400 on the other surface of the separator 300 (Step 1-4).

Between Step 1-3 and Step 1-4, a step for forming an adhesive layer on the other surface of the separator 300 may be further included. The adhesive layer may be an adhesive layer including a host layer and a guest layer, and the method of forming the adhesive layer 200 is the same as described above and will not be described here.

One of the methods of manufacturing an electrode assembly according to an exemplary embodiment of the present invention may further include performing lamination at 60 to 100° C. under a pressure of 80 kgf to 150 kgf after Step 1-4 (Step 1-5). When lamination is performed under the above-described condition, damage to the electrode and the separator may be minimized and the adhesive strength may be improved.

Hereinafter, another one of the methods of manufacturing an electrode assembly according to an exemplary embodiment of the present invention will be described.

Such a method of manufacturing an electrode assembly according to an exemplary embodiment of the present invention may include forming a guest layer 202 comprising a guest on a first electrode 100 (Step 2-1).

Step 2-1 may be a step for forming a guest layer 202 by coating the first electrode with a composition for forming a guest layer including a guest and a solvent, such that an amount of the guest loaded becomes 0.5 mg/25 cm$^2$ to 20 mg/25 cm$^2$, preferably 1.5 mg/25 cm$^2$ to 5 mg/25 cm$^2$, and more preferably 2 mg/25 cm$^2$ to 2.5 mg/25 cm$^2$.

When the above-described condition is satisfied, an adhesive strength between the electrode and the separator is increased, and a volume resistance and a wetting speed of the electrode are decreased to a level that does not affect battery performance.

The description of the composition for forming the guest layer and the method of forming the guest layer 202 have been provided and will be omitted.

Another one of the methods of manufacturing an electrode assembly according to an exemplary embodiment of the present invention includes forming a host layer 201 comprising a host on one surface of the separator 300 (Step 2-2).

Step 2-2 may be a step for forming a host layer 201 by coating one surface of the separator 300 with a composition for forming a host layer including a host and a solvent such that an amount of the host loaded becomes 0.5 mg/25 cm$^2$ to 20 mg/25 cm$^2$, preferably 1.5 mg/25 cm$^2$ to 5 mg/25 cm$^2$, and more preferably 2 mg/25 cm$^2$ to 2.5 mg/25 cm$^2$.

When the above-described condition is satisfied, an adhesive strength between the electrode and the separator is increased, and a volume resistance and a wetting speed of the electrode are decreased to a level that does not affect battery performance.

The description of the composition for forming a host layer and the method of forming the host layer 201 have been provided and thus will be omitted.

Another one of the methods of manufacturing an electrode assembly according to an exemplary embodiment of the present invention includes forming an adhesive layer 200 by disposing the guest layer 202 and the host layer 201 to be in contact with each other (Step 2-3).

Another one of the methods of manufacturing an electrode assembly according to an exemplary embodiment of the present invention includes disposing a second electrode 400 on the other surface of the separator 300 (Step 2-4).

Between Step 2-3 and Step 2-4, a step for forming a separate adhesive layer on the other surface of the separator 300 may be further included. When the separate adhesive layer is an adhesive layer including a host layer and a guest layer, it may be formed as described in the method of forming the adhesive layer 200, and thus a forming method of the separate adhesive layer will not be described here. Although the separate adhesive layer is an adhesive layer different adhesive from the adhesive layer 200, it may be formed as described in the method of forming the adhesive layer 200, and thus the separate adhesive layer will not be described.

Another one of the methods of manufacturing an electrode assembly according to an exemplary embodiment of the present invention may further include performing lamination at 60 to 100° C. under a pressure of 80 kgf to 150 kgf after Step 2-4 (Step 2-5). When lamination is performed under the above-described condition, damage to the electrode and the separator may be minimized and the adhesive strength may be improved.

Figure 2:
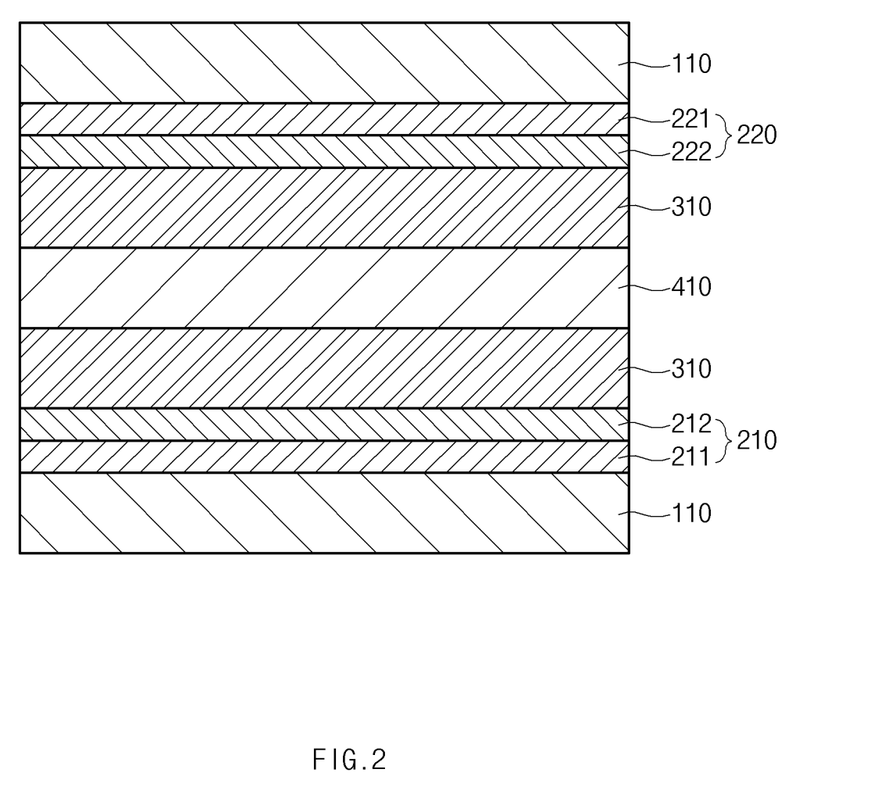
FIG. 2 is a cross-sectional view of an electrode assembly according to another exemplary embodiment of the present invention.

FIG. 2 is a cross-sectional view of an electrode assembly according to another exemplary embodiment of the present invention. The electrode assembly according to another exemplary embodiment of the present invention may be an electrode assembly with a bi-cell structure, and specifically, an electrode assembly with a C type bi-cell structure.

Referring to FIG. 2, the electrode assembly according to another exemplary embodiment of the present invention has a structure in which a first electrode 110, a first adhesive layer 210, a separator 310, a second electrode 410, a separator 310, a second adhesive layer 220, and a first electrode 110 are sequentially stacked. A separate adhesive layer may be further disposed between the separator 310 and the second electrode 410.

The first electrode 110 may be a negative electrode and the second electrode 410 may be a positive electrode. This is because, due to a compositional difference between the negative electrode and the positive electrode, it is preferable that the first adhesive layer and the second adhesive layer are disposed between the separator and the negative electrode having a weak adhesive strength.

Description of the first electrode 110 is the same as that of the first electrode 100, and will be omitted. Description of the second electrode 410 is the same as that of the second electrode 400, and will also be omitted.

While the first adhesive layer 210 and the second adhesive layer 220 are disposed between the first electrode 110 and the separator 310, the positions of a host layer 211 and a guest layer 212, which are included in the first adhesive layer 210, may be different from those shown in FIG. 2. In addition, the positions of a second host layer 221 and a second guest layer 222, which are included in the second adhesive layer 220, may also be different from those shown in FIG. 2.

Descriptions of the first adhesive layer 210 and the second adhesive layer 220 are the same as that of the adhesive layer 200, and will be omitted. Descriptions of the first host layer 211 and the second host layer 221 are the same as that of the host layer 201, and will be omitted. Descriptions of the first guest layer 212 and the second guest layer 222 are the same as that of the guest layer 202, and will be omitted.

Description of the separator 310 is the same as that of the separator 300, and will be omitted.

Description of the separate adhesive layer has already been provided, and thus will be omitted.

Figure 3:
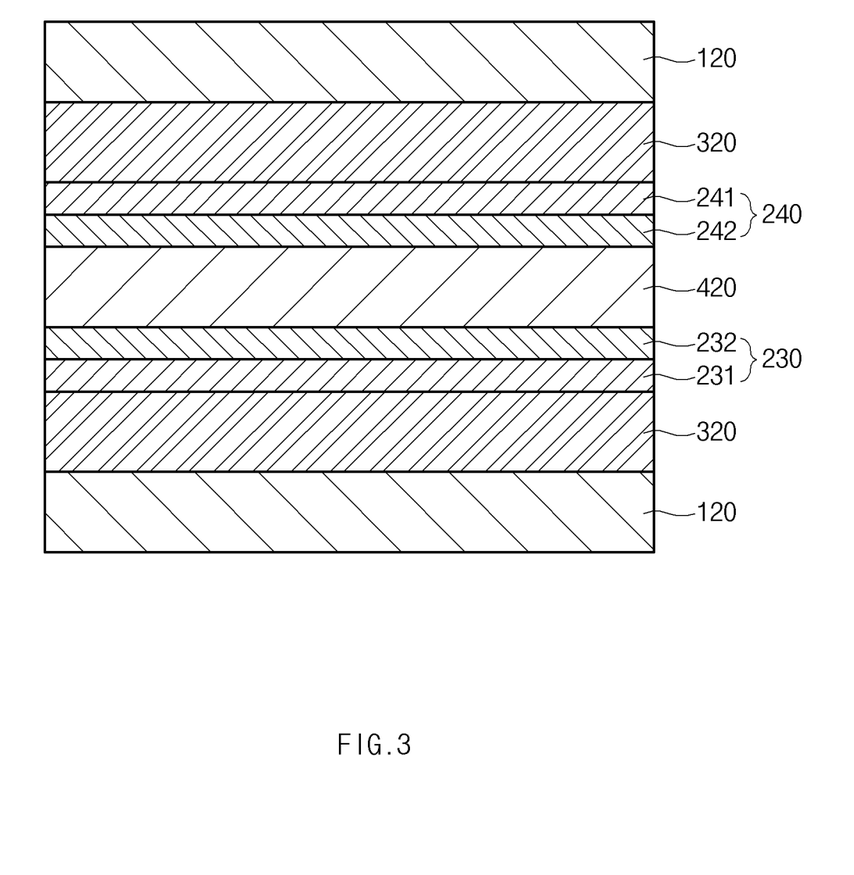
FIG. 3 is a cross-sectional view of an electrode assembly according to still another exemplary embodiment of the present invention.

FIG. 3 is a cross-sectional view of an electrode assembly according to still another exemplary embodiment of the present invention.

An electrode assembly according to still another exemplary embodiment of the present invention may be an electrode assembly with a bi-cell structure, and specifically an electrode assembly with an A type bi-cell structure.

Referring to FIG. 3, the electrode assembly according to still another exemplary embodiment of the present invention has a structure in which a first electrode 120, a separator 320, a third adhesive layer 230, a second electrode 420, a fourth adhesive layer 240, a separator 320, and a first electrode 120 are sequentially stacked. A separate adhesive layer may be further disposed between the first electrode 120 and the separator 320.

The first electrode 120 may be a positive electrode, and the second electrode 420 may be a negative electrode. This is because, as described above, due to a compositional difference between the negative electrode and the positive electrode, it is preferable that the third adhesive layer and the fourth adhesive layer are disposed between the separator and the negative electrode having a weak adhesive strength.

Description of the first electrode 120 is the same as that of the first electrode 100, and will be omitted. Description of the second electrode 420 is the same as that of the second electrode 400, and will also be omitted.

The positions of a host layer 231 and a guest layer 232, included in the third adhesive layer 230, may be different from those shown in FIG. 3, when the third adhesive layer 230 and the fourth adhesive layer 240 are disposed between the separator 320 and the second electrode 420. In addition, the positions of a host layer 241 and a guest layer 242, which are included in the fourth adhesive layer 240, may also be different from those shown in FIG. 3.

Descriptions of the third adhesive layer 230 and the fourth adhesive layer 240 are the same as that of the adhesive layer 200, and will be omitted. Descriptions of the third host layer 231 and the fourth host layer 241 are same as that of the host layer 201, and will be omitted. Descriptions of the third guest layer 232 and the fourth guest layer 242 are the same as that of the guest layer 202, and will also be omitted.

Description of the separator 320 is the same as that of the separator 300 and will be omitted.

The description of the separate adhesive layer has already been provided and will be omitted.

The present invention provides a secondary battery including the electrode assembly according to an exemplary embodiment of the present invention, the electrode assembly according to another exemplary embodiment of the present invention, or the electrode assembly according to still another exemplary embodiment of the present invention, and an electrolyte.

The descriptions of the electrode assemblies have already been provided and will be omitted.

The electrolyte may be a non-aqueous electrolyte containing a lithium salt. Specific examples of the lithium salt may include LiCl, LiBr, LiI, LiClO$_4$, LiBF$_4$, LiBF$_4$, LiB$_{10}$Cl$_{10}$, LiPF$_6$, LiCF$_3$SO$_3$, LiCF$_3$CO$_2$, LiAsF$_6$, LiSbF$_6$, LiAlCl$_4$, CH$_3$SO$_3$Li, (CF$_3$SO$_2$)$_2$NLi, lower aliphatic lithium carbonate, lithium tetraphenyl borate, and imide.

The non-aqueous electrolyte may be any one used in the battery, and may be, but is not particularly limited to, a non-aqueous organic solvent, an organic solid electrolyte, or an inorganic solid electrolyte. Specifically, the organic solid electrolyte may be a polyethylene derivative, a polyethylene oxide derivative, a polypropylene oxide derivative, a phosphoric acid ester polymer, poly agitation lysine, polyester sulfide, a polyvinylalcohol, a polyvinylidenefluoride, or a polymer comprising an ionic dissociable group.

The shape of the secondary battery is not specifically limited, but for example, may be a cylindrical, prismatic, pouch or coin shape using a can.

| <Explanation of reference numerals> | |
|---|---|
| 100, 110, 120: First electrode | 200: Adhesive layer |
| 210: First adhesive layer | 220: Second adhesive layer |
| 230: Third adhesive layer | 240: Fourth adhesive layer |
| 201: Host layer | 202: Guest layer |
| 211: First host layer | 212: First guest layer |
| 221: Second host layer | 222: Second guest layer |
| 231: Third host layer | 232: Third guest layer |
| 241: Fourth host layer | 242: Fourth guest layer |
| 300, 310, 320: Separator | 400, 410, 420: Second electrode |

EXAMPLES

Hereinafter, examples of the present invention will be described in detail to be easily implemented by those of ordinary skill in the art. However, the present invention may be embodied various forms and is not limited to those described herein.

Examples 1 to 6

Manufacture of Electrode Assembly

Preparation of Composition for Forming Host Layer

A 0.5M composition for forming a host layer was prepared by mixing a host with a solvent, which are listed in Table 1.

TABLE 1

| Type | Host | Solvent |
|---|---|---|
| Composition for forming a host layer 1 (H1) | α-cyclodextrin | Acetone |
| Composition for forming a host layer 2 (H2) | cucurbituril | Potassium hydroxide |

Preparation of Composition for Forming Guest Layer

A 0.5M composition for forming a guest layer was prepared by mixing a guest with a solvent, which are listed in Table 2.

TABLE 2

| Type | Guest | Solvent |
|---|---|---|
| Composition for forming a guest layer | Rotaxane | Chloroform |

Manufacture of Positive Electrode

A mixture was prepared with 92 wt % of lithium cobalt composite oxide ($LiCoO_2$) as a positive electrode active material, 4 wt % of carbon black as a conducting material, and 4 wt % of polyvinylidene fluoride (PVdF) as a binder polymer and added to a solvent N-methyl-2-pyrrolidone (NMP), thereby preparing a positive electrode mixture slurry. The positive electrode mixture slurry was applied to a positive electrode collector with a thickness of 20 μm, which was an aluminum (Al) thin film, dried to manufacture a positive electrode, and then roll-pressed, resulting in a positive electrode with a thickness of 100 μm.

Manufacture of Negative Electrode

A mixture was prepared with 96 wt % of carbon powder as a negative electrode active material, 1 wt % of carbon black as a conducting material and 3 wt % of PVDF as a binder polymer and added to a solvent N-methyl-2-pyrrolidone, thereby preparing a negative electrode mixture slurry. The negative electrode mixture slurry was applied to a negative electrode collector with a thickness of 10 μm, which was a copper (Cu) thin film, dried to prepare a negative electrode, and then roll-pressed, resulting in a negative electrode with a thickness of 120 μm.

Manufacture of Electrode Assembly

A host layer was formed by spin-coating the negative electrode manufactured above with a composition for forming a host layer listed in Table 3 in an amount such that the amount of a host loaded became the amount listed in Table 3. A guest layer was formed by spin-coating one surface of a separator (Trade Name: SRS, Manufacturer: LG Chem) with a composition for forming a guest layer in an amount such that the amount of a host loaded became 5 mg/25 $cm^2$. The host layer and the guest layer were disposed to be in contact with each other, resulting in an adhesive layer. A host layer was formed by spin-coating the other surface of the separator with the composition for forming a host layer listed in Table 3 in an amount such that the amount of a host loaded became the amount listed in Table 3. A guest layer was formed by spin-coating one surface of a positive electrode with the composition for forming a guest layer in an amount such that the amount of a guest loaded became 5 mg/25 $cm^2$. The host layer and the guest layer were disposed to be in contact with each other, resulting in an adhesive layer. Subsequently, the layers manufactured above were laminated under conditions of a temperature and a pressure listed in Table 3, resulting in an electrode assembly.

TABLE 3

| | Host layer | | Lamination | |
|---|---|---|---|---|
| Division | Type | Loaded amount (mg/25 $cm^2$) | Temperature (° C.) | Pressure (kgf) |
| Example 1 | H1 | 1.5 | 90 | 100 |
| Example 2 | H1 | 2.5 | 90 | 100 |
| Example 3 | H1 | 2.5 | 80 | 100 |
| Example 4 | H1 | 2.5 | 70 | 100 |
| Example 5 | H1 | 5.0 | 90 | 100 |
| Example 6 | H2 | 2.5 | 90 | 100 |

Comparative Examples 1 and 2

Manufacture of Electrode Assembly

The positive electrode manufactured in Example 1, a separator (Trade Name: SRS, Manufacturer: LG Chem) and a negative electrode were sequentially stacked and laminated under temperature and pressure conditions listed in Table 4, resulting in an electrode assembly.

TABLE 4

| Division | Temperature (° C.) | Pressure (kgf) |
|---|---|---|
| Comparative Example 1 | 90 | 100 |
| Comparative Example 2 | 120 | 200 |

Experimental Example 1

Evaluation of Adhesive Strength

Each of the battery assemblies of Example 1 to Example 6, Comparative Example 1 and Comparative Example 2 was cut to have a width of 1 cm and a length of 10 cm, and fixed on a slide glass. The negative electrode and the positive electrode were peeled off from the separator for a 180-degree peel test to measure peel strength (adhesive strength). Evaluation was carried out by measuring peel strength five or more times and determining an average value therefrom, and the result is shown in Table 5.

Experimental Example 2

Evaluation of Wetting Speed

Each of the electrode assemblies of Example 1 to Example 6, Comparative Example 1, and Comparative Example 2 was cut to have a length of 5 cm and a width of 5 cm and immersed in an electrolyte (EC/EMC=1/2 (volume ratio), 1 mol LiPF$_6$) at a depth of 5 mm, and weight change was calculated 1 hour later. Afterward, the change in weight was converted using an electrolyte density, and the result is shown in Table 5.

TABLE 5

| Division | Adhesive strength between negative electrode and separator (gf/1 cm) | Adhesive strength between positive electrode and separator (gf/1 cm) | Wetting speed (cm/sec$^{0.5}$) |
| --- | --- | --- | --- |
| Example 1 | 139 | 195 | 0.0361 |
| Example 2 | 182 | 210 | 0.0354 |
| Example 3 | 176 | 205 | 0.0358 |
| Example 4 | 166 | 196 | 0.0360 |
| Example 5 | 185 | 212 | 0.0345 |
| Example 6 | 165 | 198 | 0.0355 |
| Comparative Example 1 | 107 | 188 | 0.0368 |
| Comparative Example 2 | 155 | 220 | 0.0295 |

Referring to Table 5, the adhesive strength between the negative electrode and the separator of each of the electrode assembly of Examples 1 to 6 was higher than that of the electrode assembly of Comparative Example 1. Particularly, the adhesive strength of the electrode assembly of Example 5 was improved up to approximately 173% of that of the electrode assembly of Comparative Example 1. In addition, it was seen that the electrode assemblies of Examples 1 to 6 exhibited an equivalent wetting speed to that of Comparative Example 1.

However, it was confirmed that the adhesive strength between the electrode and the separator was not significantly improved even with twice as high loaded amounts of the compositions for forming a host layer and a guest layer in the electrode assemblies of Examples 2 and 5. From the results, it was confirmed that loading of the compositions for forming a host layer and a guest layer in suitable amounts are advantageous for manufacturing cost and process efficiency.

When there was only a difference in lamination conditions between the electrode assemblies of Examples 2 to 4, the electrode assembly of Example 2 which had the higher lamination temperature had the highest adhesive strength, and the electrode assembly of Example 4 which had the lowest lamination temperature also had excellent adhesive strength. Since such lamination conditions for the electrode assemblies of Examples 2 to 4 were almost similar to the lamination conditions for a bi-cell, it can be estimated that even when applied to the bi-cell, the electrode assembly according to the present invention can achieve excellent adhesive strength without an additional process.

The adhesive strength of the electrode assembly of Comparative Example 2 was improved compared to those of Example 1 and Comparative Example 1, since the electrode assembly of Comparative Example 2 was laminated at a high temperature and a high pressure. However, due to the lamination performed at a high temperature and a high pressure, it can be seen that the wetting speed of the electrode assembly of Comparative Example 2 was drastically reduced. From the wetting speed of the electrode assembly of Comparative Example 2, it can be estimated that the electrode assembly of Comparative Example 2 had a significant reduction in the interface gap between the electrode and the separator and therefore increased resistance in electrolyte wettability, resulting in damage to the separator.

The invention claimed is:

1. An electrode assembly, comprising:
   a first electrode;
   first adhesive layer disposed on the first electrode and including a first host layer comprising a first host and a first guest layer comprising a first guest;
   a separator disposed on the first adhesive layer; and
   a second electrode disposed on the separator,
   wherein the host is a supramolecule.

2. The electrode assembly of claim 1, wherein the supramolecule is a circular molecule.

3. The electrode assembly of claim 1, wherein the first host is one or more selected from the group consisting of cyclodextrin, calixarene, pillararene, cucurbituril, porphyrin, metallacrown, crown ether, zeolite, cyclotriveratrylene, cryptophane, carcerand, and foldamer.

4. The electrode assembly of claim 1, wherein the first guest is one or more selected from the group consisting of ferrocene, cadmium, lead, a lanthanide element, an actinide element, tetraphenylethene, p-xylenediammonium, Fe, Mg, Mn, N,N-bis(salicylaldehyde)ethylenediamine, and rotaxane.

5. The electrode assembly of claim 1, wherein the first host layer is disposed on the first electrode, and
   the first guest layer is disposed on the first host layer.

6. The electrode assembly of claim 1, wherein the first guest layer is disposed on the first electrode, and
   the first host layer is disposed on the first guest layer.

7. The electrode assembly of claim 1, wherein the electrode assembly further comprises a second adhesive layer including a second host layer comprising a second host and a second guest layer comprising a second guest between the separator and the second electrode.

8. The electrode assembly of claim 7, wherein the second host layer is disposed on the separator, the second guest layer is disposed on the second host layer, and the second electrode is disposed on the second guest layer.

9. The electrode assembly of claim 7, wherein the second guest layer is disposed on the separator, the second host layer is disposed on the second guest layer, and the second electrode is disposed on the second host layer.

10. A method of manufacturing an electrode assembly, comprising:
    forming a host layer comprising a host on a first electrode;
    forming a guest layer comprising a guest on a first surface of a separator;
    forming an adhesive layer by disposing the host layer and the guest layer to be in contact with each other; and
    disposing a second electrode on a second surface of the separator,
    wherein the host is a supramolecule.

11. The method of claim 10, wherein the host layer is formed by coating the first electrode with a composition for forming the host layer including the host and a solvent such that an amount of the host loaded becomes 0.5 mg/25 cm$^2$ to 20 mg/25 cm$^2$.

12. The method of claim 10, wherein the guest layer is formed by coating one surface of the separator with a composition for forming the guest layer including the guest and a solvent such that an amount of the guest loaded becomes 0.5 mg/25 cm$^2$ to 20 mg/25 cm$^2$.

13. The method of claim 10, wherein the method of manufacturing an electrode assembly further comprises:

performing lamination at 60 to 100° C. under a pressure of 80 kgf to 150 kgf after disposing the second electrode on the second surface of the separator.

14. A method of manufacturing an electrode assembly, comprising:

forming a guest layer comprising a guest on a first electrode;

forming a host layer comprising a host on a first surface of a separator;

forming an adhesive layer by disposing the guest layer and the host layer to be in contact with each other; and disposing a second electrode on a second surface of the separator, wherein the host is a supramolecule.

15. The method of claim 14, wherein the guest layer is formed by coating the first electrode with a composition for forming the guest layer including the guest and a solvent such that an amount of the guest loaded becomes 0.5 mg/25 cm$^2$ to 20 mg/25 cm$^2$.

16. The method of claim 14, wherein the host layer is formed by coating one surface of the separator with a composition for forming the host layer including the host and a solvent such that an amount of the host loaded becomes 0.5 mg/25 cm$^2$ to 20 mg/25 cm$^2$.

17. The method of claim 14, wherein the method of manufacturing an electrode assembly further comprises:

performing lamination at 60 to 100° C. under a pressure of 80 kgf to 150 kgf after disposing the second electrode on the second surface of the separator.

18. A secondary battery comprising electrode assembly according to claim 1, wherein the secondary battery has a shape selected from the group consisting of cylindrical, prismatic, pouch, and coin.

* * * * *